US007063059B2

(12) United States Patent
Calderwood

(10) Patent No.: US 7,063,059 B2
(45) Date of Patent: Jun. 20, 2006

(54) PISTON ENGINE WITH SELECTABLE FIRING ORDER

(76) Inventor: Richard C. Calderwood, 2775 NW. 126th Ave., Portland, OR (US) 97229-8381

( * ) Notice: Subject to any disclaimer, the term of this patent is extended or adjusted under 35 U.S.C. 154(b) by 0 days.

(21) Appl. No.: 10/990,908

(22) Filed: Nov. 17, 2004

(65) Prior Publication Data
US 2006/0102124 A1    May 18, 2006

(51) Int. Cl.
*F02P 1/00*    (2006.01)
(52) U.S. Cl. ............................. 123/146.5 A; 123/90.11; 123/478
(58) Field of Classification Search ............. 123/90.11, 123/90.15, 478, 480, 146.5 A
See application file for complete search history.

(56) References Cited

U.S. PATENT DOCUMENTS 4,805,571 A * 2/1989 Humphrey .................. 123/316
5,333,583 A * 8/1994 Matsuura ..................... 123/295

* cited by examiner

*Primary Examiner*—John T. Kwon
(74) *Attorney, Agent, or Firm*—Richard Calderwood

(57) ABSTRACT

A multi-cylinder four-stroke internal combustion engine enabling a method for on-the-fly switching between two or more firing orders. Switching to the new firing order is done without requiring any tear-down of the engine such as to swap camshafts. Switching can be triggered by the rider, or it can be triggered automatically per conditions such as selected gear, RPM range, track location, velocity, and the like.

32 Claims, 10 Drawing Sheets

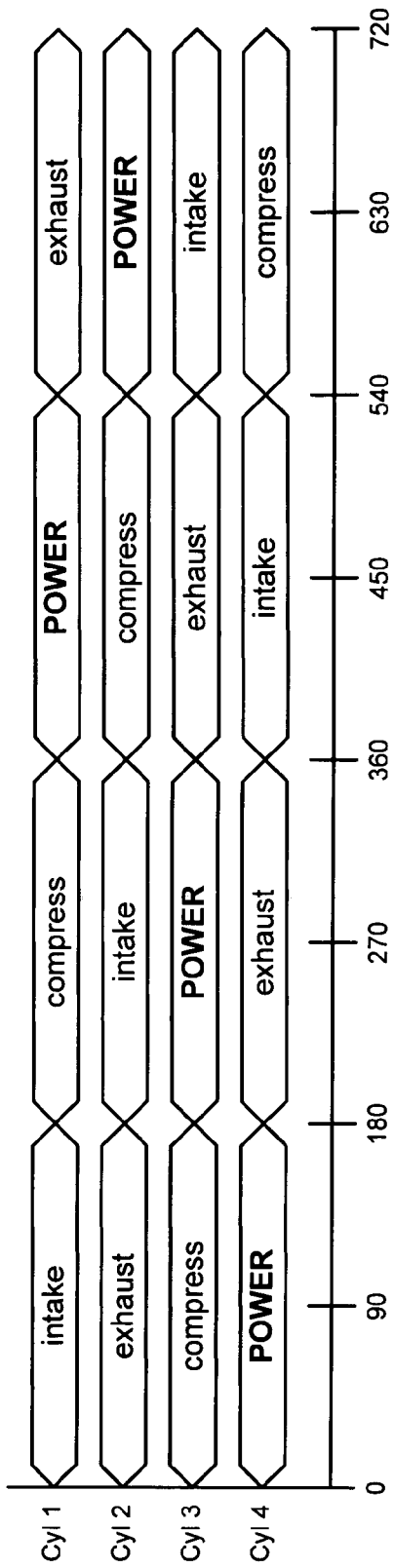
Fig. 9 – 180° screamer
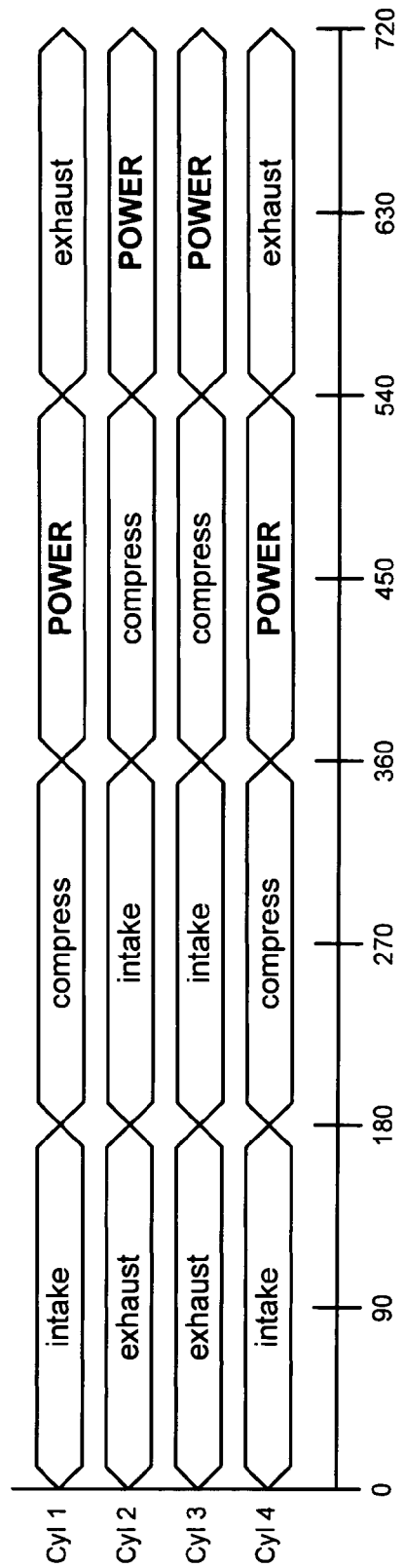
Fig. 10 – 180° big bang

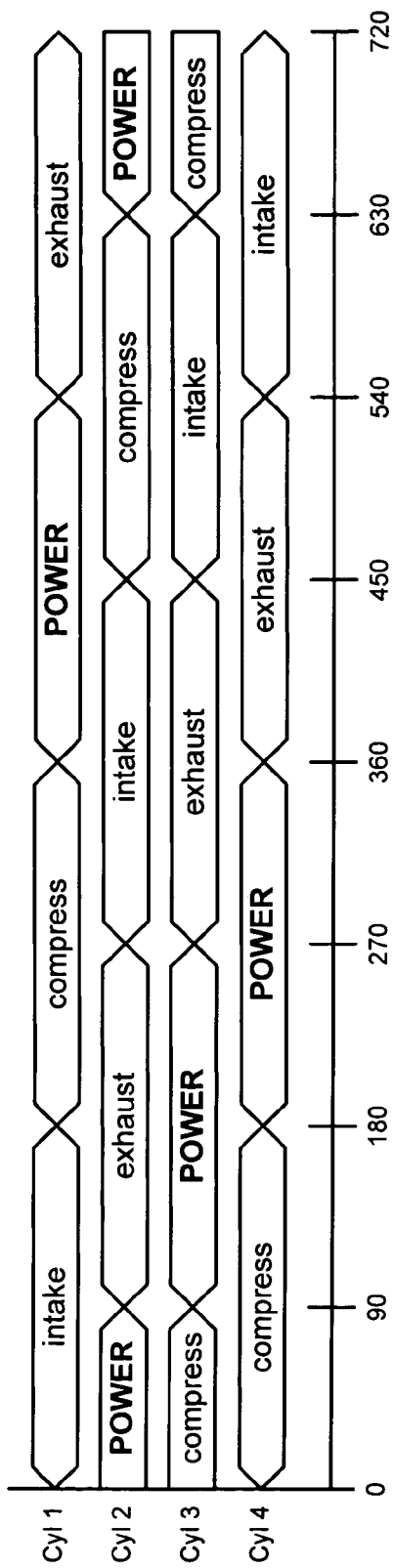
Fig. 11 - 90° odd pulse
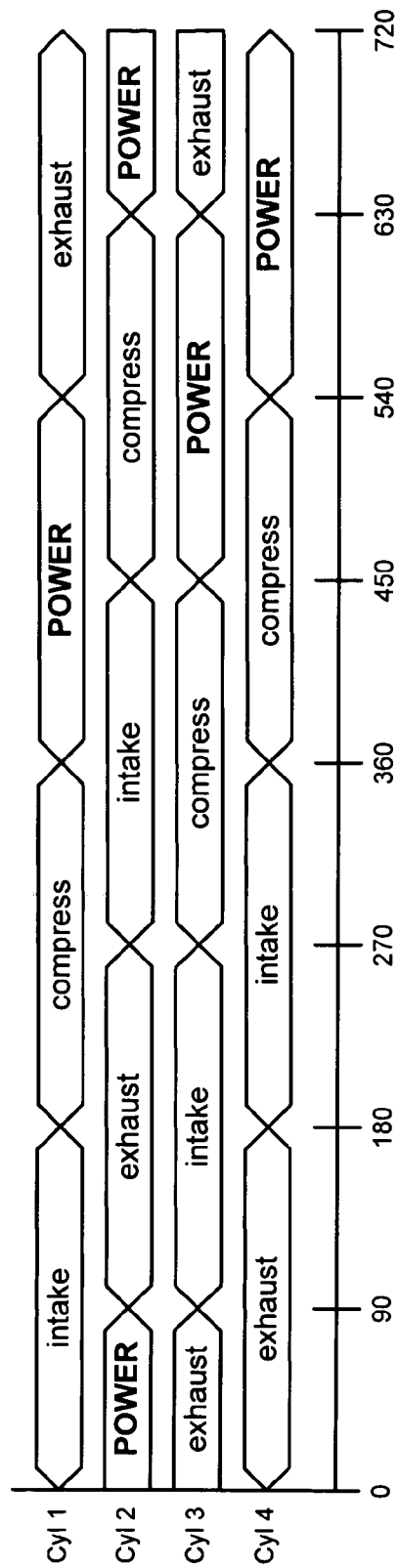
Fig. 12 - 90° even pulse

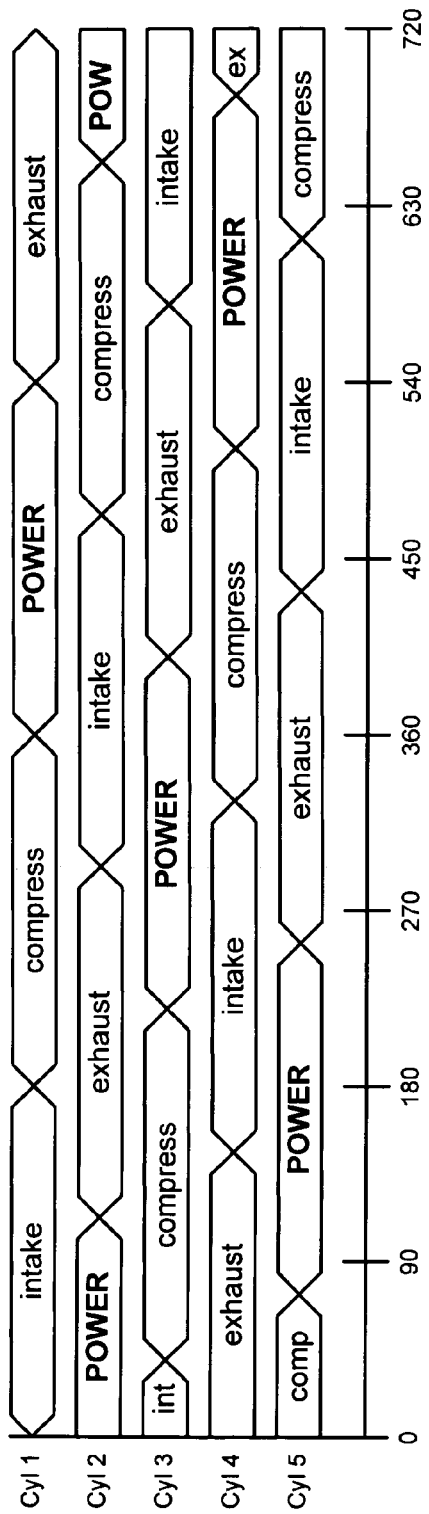
Fig. 13 - 5cyl 72° screamer
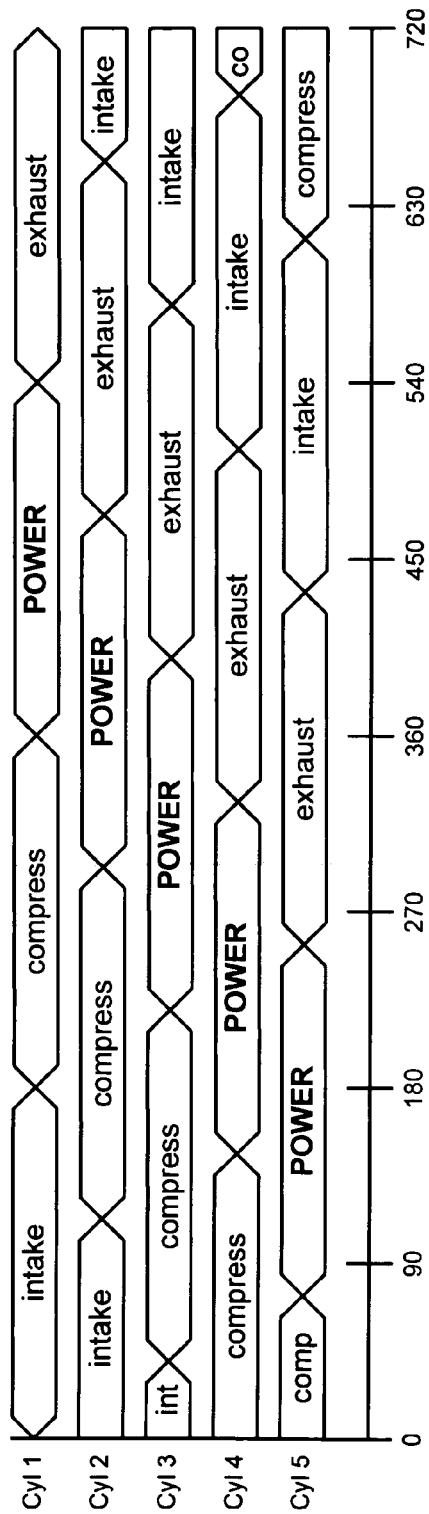
Fig. 14 - 5cyl 72° big bang

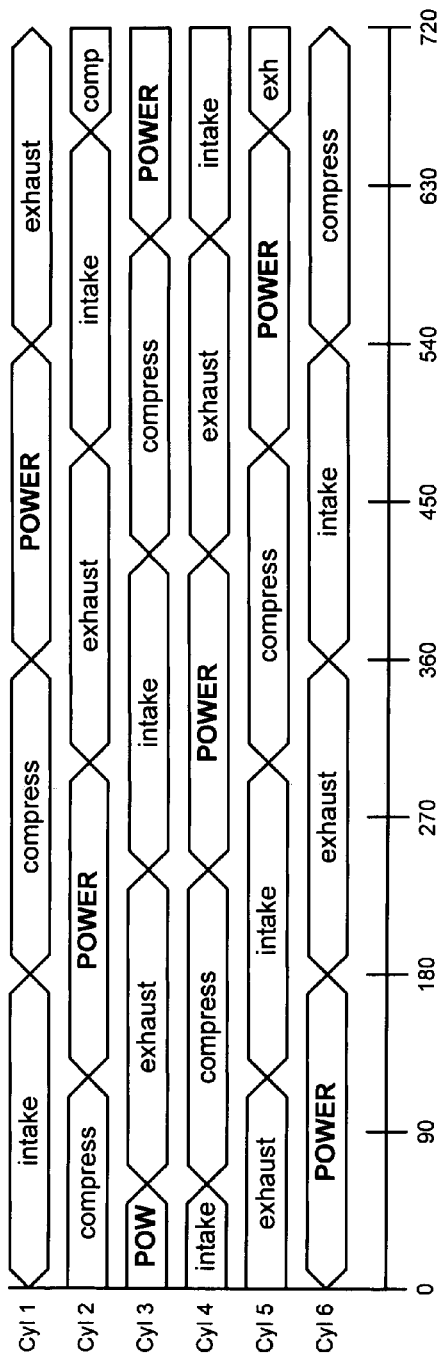
Fig. 15 - 6cyl 120° screamer
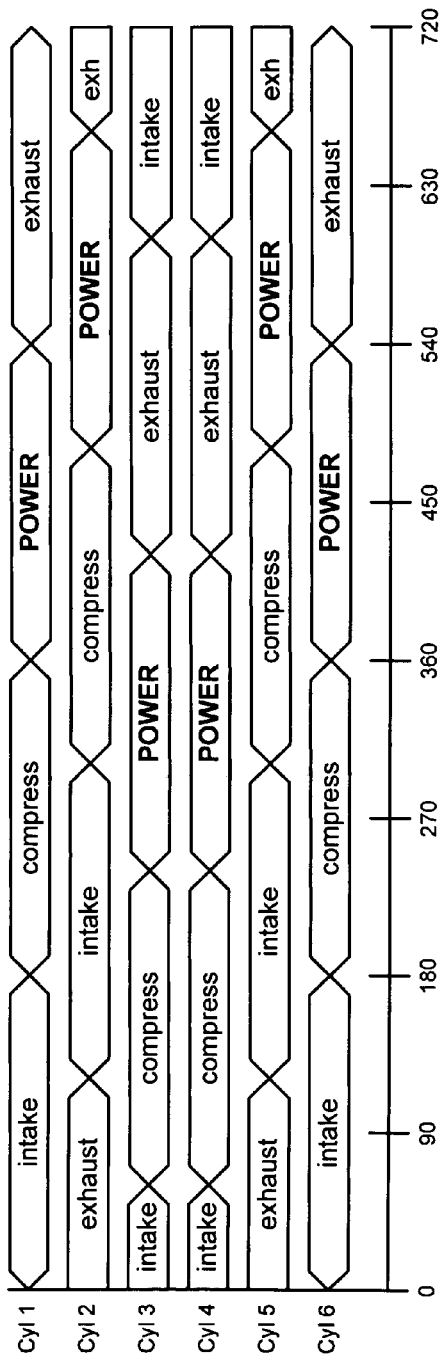
Fig. 16 - 6cyl 120° big bang

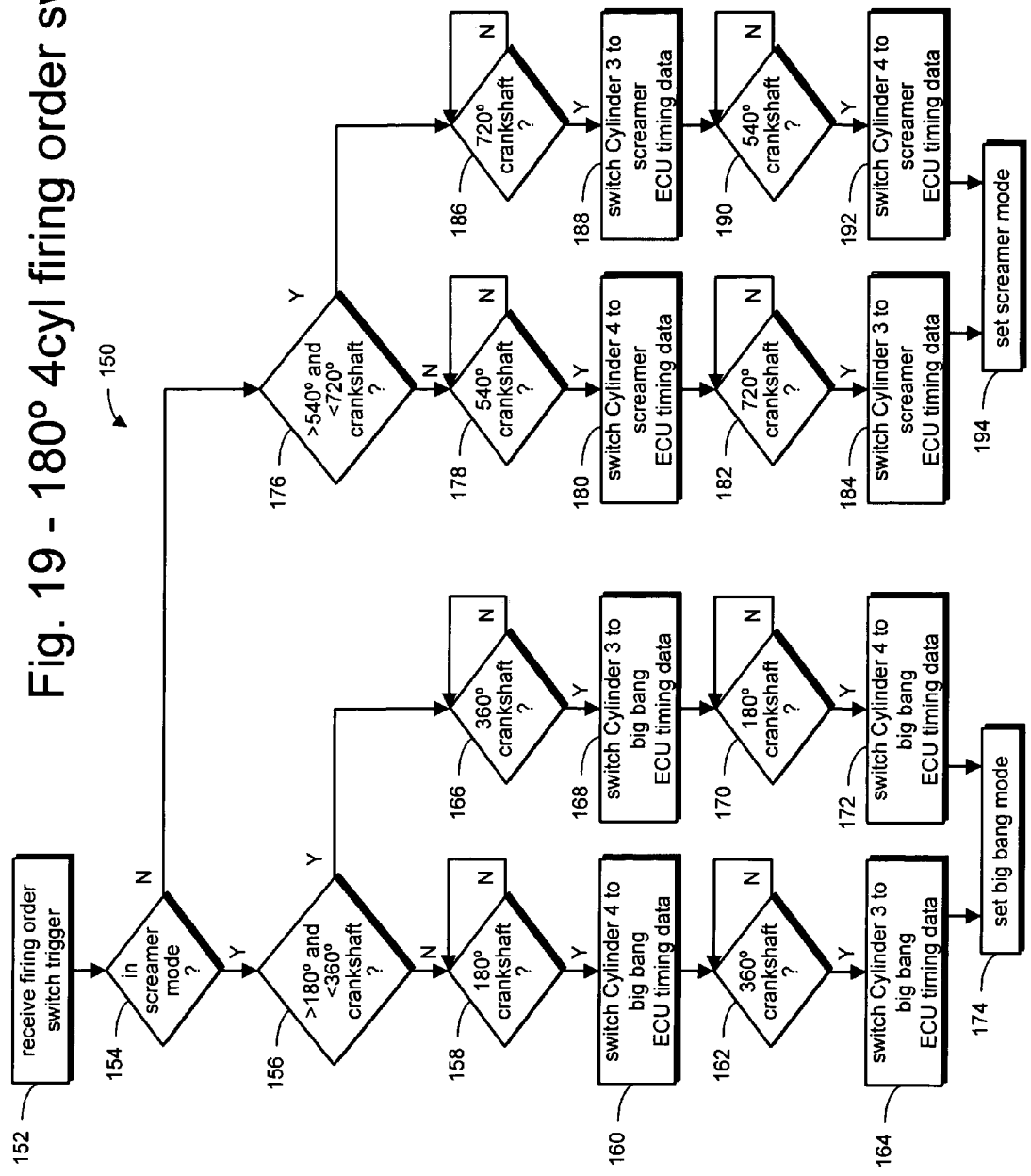

PISTON ENGINE WITH SELECTABLE FIRING ORDER

BACKGROUND OF THE INVENTION

1. Technical Field of the Invention

This invention relates generally to internal combustion engines, and more specifically to selectable firing order modes for such.

2. Background Art

The examiner is warned that the invention itself is not directly described until Page 8. The first six pages are a rather lengthy, but necessary, explanation of the prior art.

FIG. 1 illustrates a four-cylinder engine 10 which, for purposes of illustrating the present invention, has been drastically simplified. Well-known features such as gears, bearings, intake tracts, exhaust manifolds, fluids, oil pumps, transmissions, gearboxes, counter balancer shafts, gaskets, water jackets and channels, and so forth have been omitted. Those of ordinary skill in the art of internal combustion engines would not be aided by their inclusion, as they are largely irrelevant to the invention.

The four-stroke cycle is: intake, compression, power, exhaust. At the start of the intake stroke, the exhaust valve is closed and the intake valve is opened. The piston moves from TDC to BDC, filling the cylinder with fuel/air mixture. The intake valve is then closed, and the piston returns to TDC during the compression stroke. The spark plug is fired, igniting the fuel/air mixture, which expands and presses the piston back to BDC. The exhaust valve is opened, and during the exhaust stroke the piston returns to TDC, forcing the waste gasses out of the cylinder. For simplicity, such issues as valve overlap and timing advance/retard are ignored in this disclosure, as they are well-understood in the art, and their inclusion here would only render the invention harder to learn from this disclosure. The crankshaft makes two complete revolutions, rotating 720°, during each four-stroke cycle. Some engines have been built such that each spark plug fires not only at the start of its piston's power stroke, but also 360° later at the start of its piston's intake stroke. This intervening spark has generally been benign, as there is no fuel/air mixture present and essentially no compression in the cylinder.

The engine includes a lower crankcase 12 mated with an upper crankcase 14. A cylinder block 16 is coupled to the top of the upper crankcase, and includes cylinder bores 18. The lower crankcase, upper crankcase, and cylinder block are shown in cross-section or cutaway view, to facilitate viewing of the internal engine components. The head includes a set of intake valves (not visible) and exhaust valves (not visible). The intake valves are operated by a set of intake valve actuators 20. The exhaust valves are operated by a set of exhaust valve actuators 22 as shown. In most engines, the valve actuators consist of one or more camshafts; however, the present invention is far more easily practiced with individually controllable actuators such as pneumatic or hydraulic actuators, rather than actuators which operate as a set. The head further includes a set of spark plugs 24 and a set of fuel injectors 26. Many engines use carburetors instead of fuel injectors.

The engine includes a crankshaft 28 which, typically, is coupled between the lower crankcase and the upper crankcase. For each cylinder, there is a piston 30-1 through 30-4 which is coupled to the crankshaft by a connecting rod 32. As the pistons reciprocate up and down in their cylinders, their connecting rods drive the crankshaft to reciprocate around its axis.

FIG. 5 illustrates the crankshaft 28 in greater detail. The crankshaft is built around a center shaft 34. Four "big pins" 36-1 through 36-4 are offset from the axis of the center shaft by a distance which is equal to one half the stroke of the engine. (The displacement of the engine is equal to the number of cylinders*the cylinder radius squared*pi*the stroke.) Each big pin is coupled to the center shaft by two webs 38. The portion of the center shaft between the two webs is absent, or it would interfere with the connecting rod as the crankshaft turned. The remaining portions of the center shaft between adjacent big pins' webs form the "center pins" 40 of the crankshaft. The center pins and the end portions 42 of the crankshaft ride in bearings or bushings in the crankcases.

FIGS. 1 and 5 together illustrate that the respective angular positions of the big pins largely determine the firing order of the engine. The first piston 30-1 is at its top dead center (TDC) position, as is the fourth piston 30-4. The second piston 30-2 is at its bottom dead center (BDC) position, as is the third piston 30-3. The crankshaft is rotating such that its top is rotating toward the reader, out of the page, or clockwise as viewed from the end of the engine which is shown on the left.

This crankshaft 28 is known as a "flat" or "180°" crankshaft, because all four big pins lie in the same plane.

Because a four-stroke engine crankshaft makes two complete revolutions, rotating through 720°, during the four-stroke cycle of any given piston, there are a plurality of firing orders possible with any particular crankshaft. The term "firing order" refers not only to the numerical sequence in which the pistons/cylinders have their power strokes, but also the relative timing between the power strokes. Typically, the firing order is reported with cylinder one first in the order.

FIG. 9 illustrates one known firing order for a flat 180° four-cylinder crankshaft. The X axis indicates the crankshaft rotational position from 0° (with piston 30-1 at TDC) through two complete crankshaft revolutions, ending at 720°. Cylinder 1 (with piston 30-1) has its intake stroke from 0° through 180°, where it is at BDC. It then has its compression stroke from 180° through 360°, where it is again at TDC. It then has its power stroke from 360° through 540°, and its exhaust stroke from 540° through 720°.

Cylinder 2 (with piston 30-2) has its intake stroke from 180° through 360°, its compression stroke from 360° through 540°, its power stroke from 540° through 720°, and its exhaust stroke from 0° through 180°. Cylinder 3 (with piston 30-3) has its intake stroke from 540° through 720°, its compression stroke from 0° through 180°, its power stroke from 180° through 360°, and its exhaust stroke from 360° through 540°. Cylinder 4 (with piston 30-4) has its intake stroke from 360° through 540°, its compression stroke from 540° through 720°, its power stroke from 0° through 180°, and its exhaust stroke from 180° through 360°.

Thus, the four cylinders' power strokes come at exactly even 180° intervals, with the firing order 1-2-4-3. (Note that the firing order is always reported beginning with cylinder 1, rather than with the arbitrarily-selected 0° crankshaft position.) This configuration is sometimes referred to as a "screamer" engine. The equally-spaced power pulses will, in many engines, produce the least vibration. Big pins 36-1 and 36-2 are 180° out of phase; therefore, pistons 30-1 and 30-2 are always at exactly opposite relative positions, moving at exactly equal and opposite velocities, and undergoing exactly equal and opposite accelerations. The same is true of pistons 30-3 and 30-4. This gives a flat 180° crankshaft engine perfect "primary balance" (in the plane in which the pistons move).

FIG. 10 illustrates a different firing order which can be achieved with exactly the same crankshaft. The timings of Cylinders 1 and 2 are unchanged. The valve and ignition timings of Cylinders 3 and 4 are offset 360° relative to where they were in FIG. 9, such that Cylinders 2 and 3 operate together, and Cylinders 1 and 4 operate together. This configuration is sometimes referred to as a "big bang" engine. The one complete crankshaft revolution from 0° to 360° includes no power strokes. This is especially beneficial in some motorcycle applications, as it gives the rear tire time to regrip the asphalt before the next power pulses tend to make it break traction. There are two simultaneous power pulses (at 360°), then two more simultaneous power pulses 180° later (at 540°), then 540° before the next power pulse begins.

FIG. 6 illustrates a different four-cylinder crankshaft 50, in which the big pins 52 are differently positioned than in the flat 180° crankshaft described above. When the first cylinder's big pin 52-1 is at TDC, the second cylinder's big pin 52-2 is 90° after TDC, the third cylinder's big pin 52-3 is 90° before TDC, and the fourth cylinder's big pin 52-4 is at BDC. This crankshaft may be termed a "90°" crankshaft, because there is one big pin at every 90° position.

FIGS. 3 and 4 illustrate an engine 60 using the crankshaft 50. When the first piston 30-1 is at TDC, the second piston 30-2 is 90° after TDC, the third piston 30-3 is 90° before TDC, and the fourth piston 30-4 is at BDC. As shown in FIG. 4, when the first piston has advanced to 90° after TDC, the second piston is at BDC, the third piston is at TDC, and the fourth piston is 90° before TDC. The first and fourth pistons provide primary balance of each other, and the second and third pistons provide primary balance of each other (in position, velocity, and acceleration).

FIG. 11 illustrates one firing order achievable with the engine of FIGS. 3 and 4. Cylinder 1 is the reference, as above. Cylinder 2 has its intake stroke from 270° to 450°, its compression stroke from 450° to 630°, its power stroke from 630° to 90°, and its exhaust stroke from 90° to 270°. Cylinder 3 has its intake stroke from 450° to 630°, its compression stroke from 630° to 90°, its power stroke from 90° to 270°, and its exhaust stroke from 270° to 450°. Cylinder 4 has its intake stroke from 540° to 720°, its compression stroke from 0° to 180°, its power stroke from 180° to 360°, and its exhaust stroke from 360° to 540°. There are 270° between the Cylinder 1 and Cylinder 2 power pulses, 180° between the Cylinder 2 and Cylinder 3 power pulses, and 90° between the Cylinder 3 and Cylinder 4 power pulses, then 180° without a power pulse. The asymmetry of this 270/180/90/180 pulse train is why it is referred to as "odd pulse".

FIG. 12 illustrates another firing order achievable with the engine of FIGS. 3 and 4. Cylinder 1 has its power pulse at 360°, Cylinder 3 90° later at 450°, Cylinder 4 another 90° later at 540°, and Cylinder 2 another 90° later at 630°, followed by 450° of rotation before the next power pulse begins. This 90/90/90/540 sequence is why it is referred to as "even pulse"—because the four power pulses are evenly spaced.

FIG. 7 illustrates a crankshaft 70 for use in a five-cylinder engine (not shown). With the first big pin 72-1 at TDC, the second big pin 72-2 is at 144° past TDC, the third big pin 72-3 is at 72° before TDC, the fourth big pin 72-4 is at 72° after TDC, and the fifth big pin 72-5 is at 144° before TDC. There is one big pin every 360°/5=72°, and they are arranged in the familiar five-pointed-star order.

FIG. 13 illustrates a "screamer" firing order for a five-cylinder engine (not shown) utilizing the crankshaft of FIG. 7. Cylinder 1 has its power stroke at 360°, Cylinder 4 has its power stroke 144° later at 504°, Cylinder 2 has its power stroke 144° after that at 648°, Cylinder 5 has its power stroke 144° later at 72°, and Cylinder 3 has its power stroke 144° after that at 216°. The power pulses occur regularly, one every 144°. The screamer firing sequence is 1-4-2-5-3 with this crankshaft.

FIG. 14 illustrates a "big bang" firing order using the same crankshaft as in FIG. 13. Cylinder 5 has its power stroke at 72°, Cylinder 4 has its power stroke 72° later at 144°, Cylinder 3 has its power stroke 72° later at 216°, Cylinder 2 has its power stroke 72° later at 288°, and Cylinder 1 has its power stroke 72° later at 360°. The firing of Cylinders 2 and 4 has been shifted 360° from that of FIG. 13, with the other Cylinders' firing left unchanged. The big bang firing sequence is 5-4-3-2-1.

FIG. 8 illustrates a crankshaft 80 for a six-cylinder engine (not shown). The crankshaft has the conventional 120° configuration, as is typically found in six-cylinder automobile engines. That is, when viewed end-on, there are two big pins every 120°, rather than one every 60°. With big pins 82-1 and 82-6 at TDC, big pins 82-2 and 82-5 are at 120° after TDC, and big pins 82-3 and 82-4 are at 120° before TDC.

FIG. 15 illustrates the common "screamer" firing order for an in-line six-cylinder engine. Cylinder 1 has its power stroke at 360°, Cylinder 5 at 480°, Cylinder 3 at 600°, Cylinder 6 at 0°, Cylinder 2 at 120°, and Cylinder 4 at 240°. The firing order is 1-5-3-6-2-4. Any two consecutive power strokes occur on opposite halves of the crankshaft, and one power stroke occurs every 120° of rotation. The in-line six-cylinder engine is extremely well balanced, both in the primary and secondary (perpendicular to the primary) forces.

FIG. 16 illustrates a "big bang" firing order achievable using the same crankshaft as in FIG. 15. The firing of Cylinders 2, 3, and 6 is shifted 360° relative to that of FIG. 15, such that a pair of power strokes occur at 240°, a pair 120° later at 360°, and a final pair 120° later at 480°, followed by 480° without a power stroke beginning.

Previously, in order to change a given engine with a particular crankshaft from one firing order to another, it was necessary to make a host of difficult, expensive, and time-consuming modifications to the engine. For example, it has typically been necessary to tear down the engine, perhaps first removing it from the vehicle, sufficiently far to remove and replace one or more of the camshafts. It has typically also been necessary to replace the distributor cap, or reprogram the engine control unit (ECU). Such changes in the firing order take advantage of the fact that each piston is at TDC twice during each 720° four-stroke cycle; by offsetting a particular cylinder's valve, spark, and fuel injector controls by 360°, a different firing order is achieved without having to split the crankcases and replace the crankshaft. In general, there are $N^2/2$ possible firing orders for a given N-cylinder crankshaft, but only a limited number of these will be desirable; the others will suffer from balance or vibration problems.

What is desirable is an improved engine and an improved method of changing that engine's firing order, which is less difficult, less expensive, and less time-consuming than previous engines have permitted. Ideally, the firing order change should be able to be performed on the fly, such as by the vehicle's operator.

BRIEF DESCRIPTION OF THE DRAWINGS

FIG. 9 shows a diagram of a "screamer" firing order for a 180°-crank four-cylinder engine.

FIG. 10 shows a diagram of a "big bang" firing order for a 180°-crank four-cylinder engine.

FIG. 11 shows a diagram of an "odd pulse" firing order for a 90°-crank four-cylinder engine.

FIG. 12 shows a diagram of an "even pulse" firing order for a 90°-crank four-cylinder engine.

FIG. 13 shows a diagram of a "screamer" firing order for a 72°-crank five-cylinder engine.

FIG. 14 shows a diagram of a "big bang" firing order for a 72°-crank five-cylinder engine.

FIG. 15 shows a diagram of a "screamer" firing order for a 120°-crank six-cylinder engine.

FIG. 16 shows a diagram of a "big bang" firing order for a 120°-crank six-cylinder engine.

FIG. 19 shows a flowchart of one method of performing the firing order change according to the present invention.

DETAILED DESCRIPTION

The invention will be understood more fully from the detailed description given below and from the accompanying drawings of embodiments of the invention which, however, should not be taken to limit the invention to the specific embodiments described, but are for explanation and understanding only.

Figure 1:
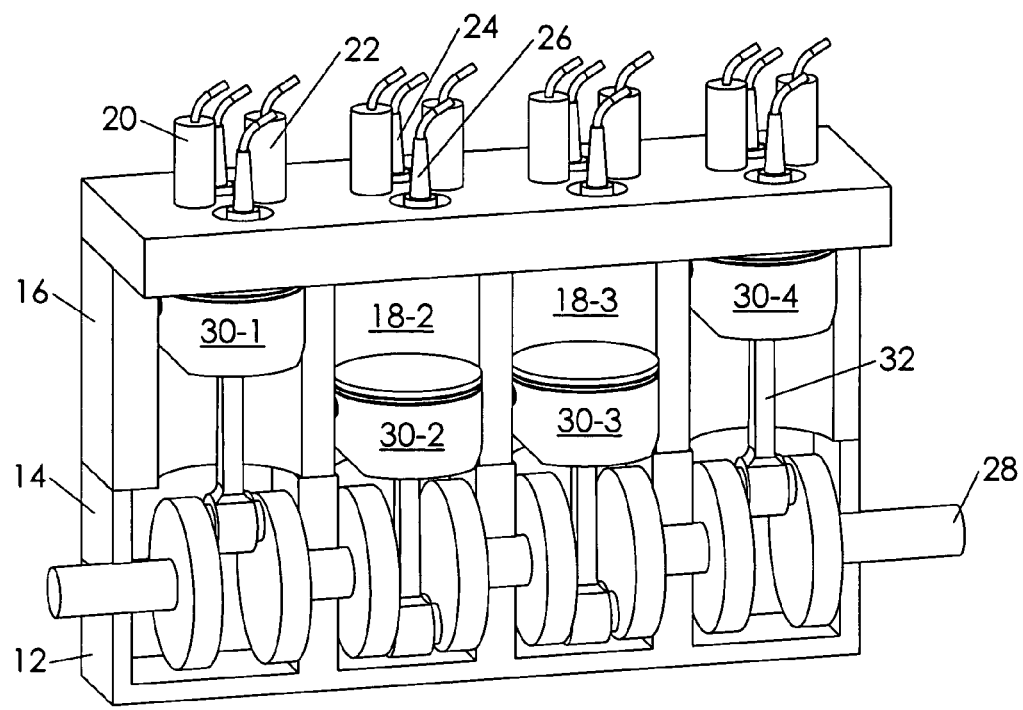
FIGS. 1 and 2 show a 180'-crank four-cylinder engine in a first position and 90° later.
Figure 2:
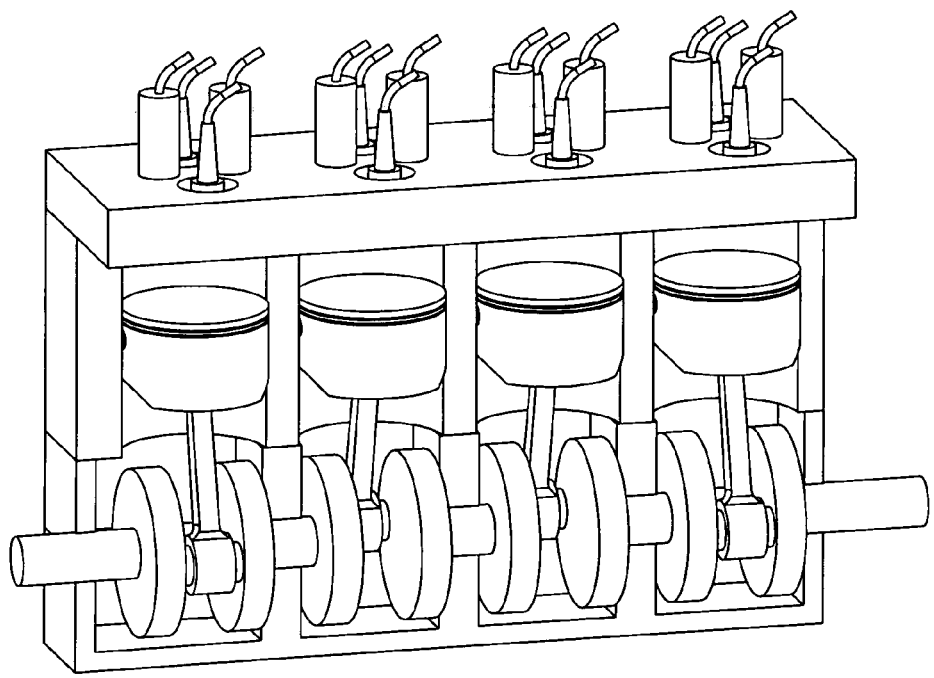
Figure 3:
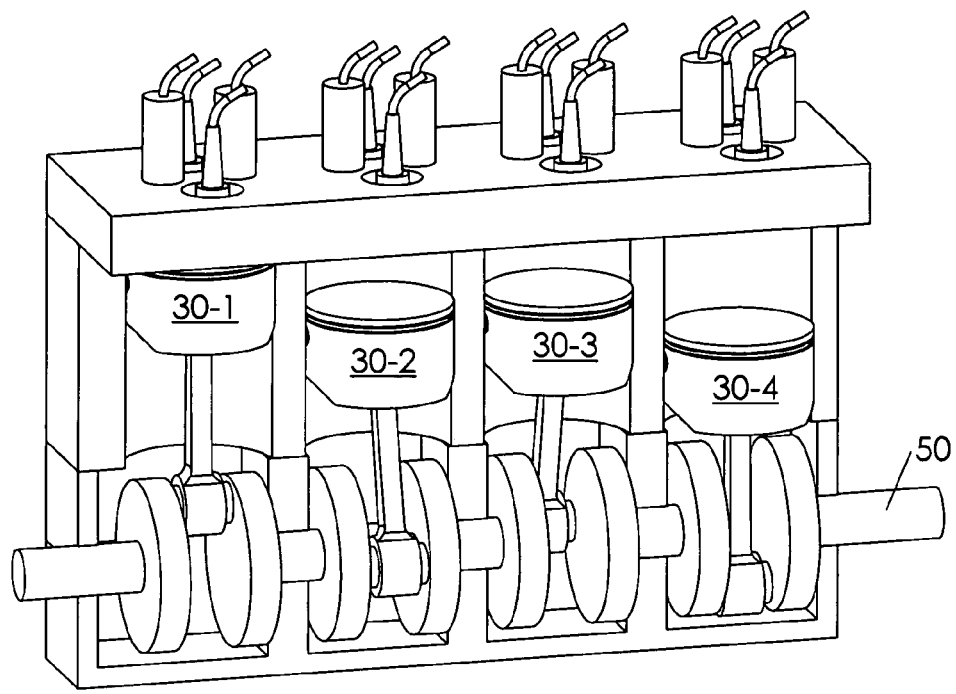
FIGS. 3 and 4 show a 90'-crank four-cylinder engine in a first position and 90° later.
Figure 4:
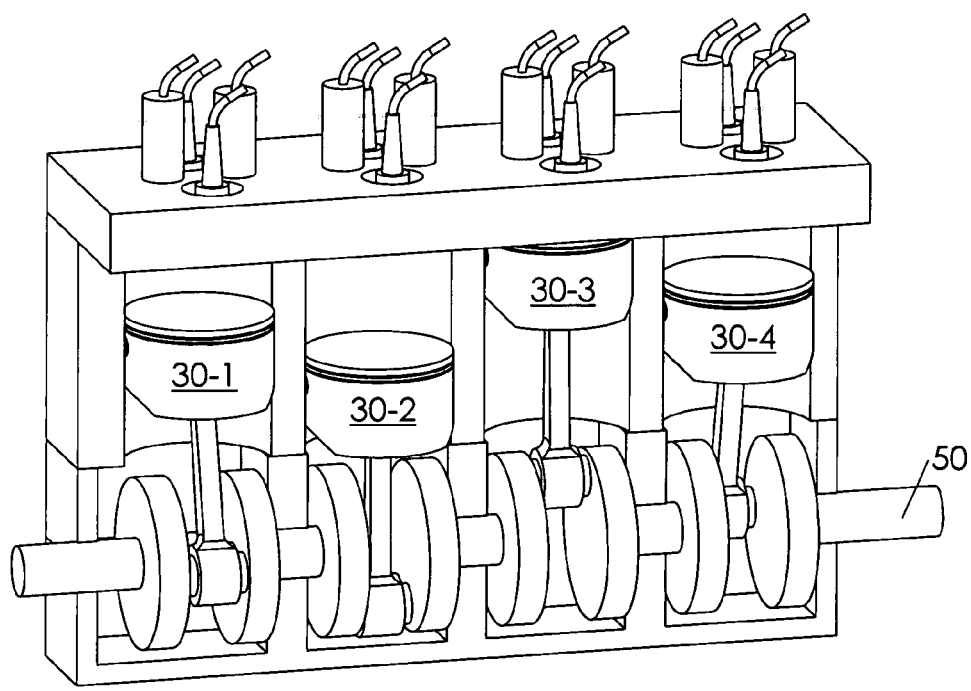
Figure 5:
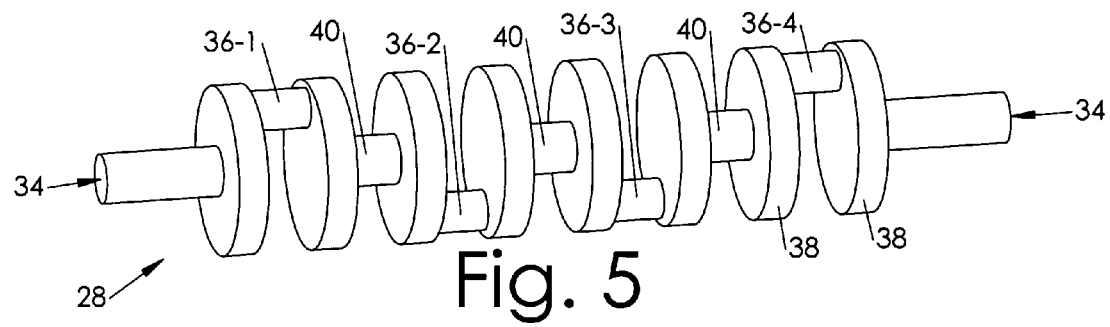
FIG. 5 shows a 180° crankshaft for a four-cylinder engine.
Figure 6:
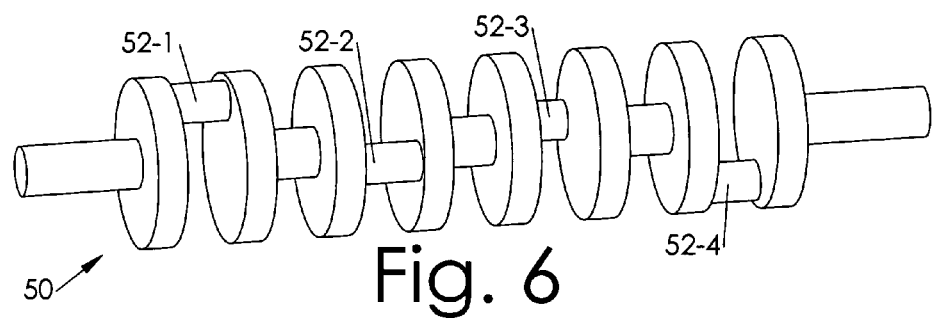
FIG. 6 shows a 90° crankshaft for a four-cylinder engine.
Figure 7:
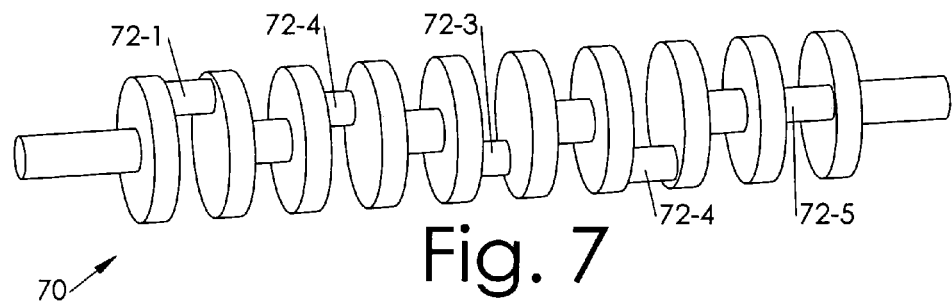
FIG. 7 shows a 72° crankshaft for a five-cylinder engine.
Figure 8:
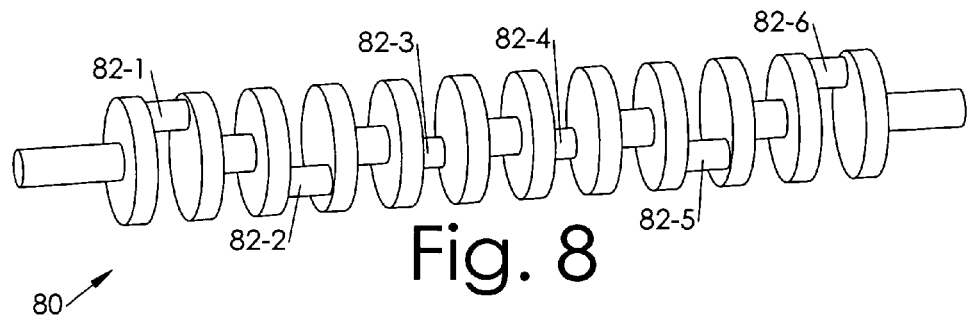
FIG. 8 shows a 60° crankshaft for a six-cylinder engine.
Figure 17:
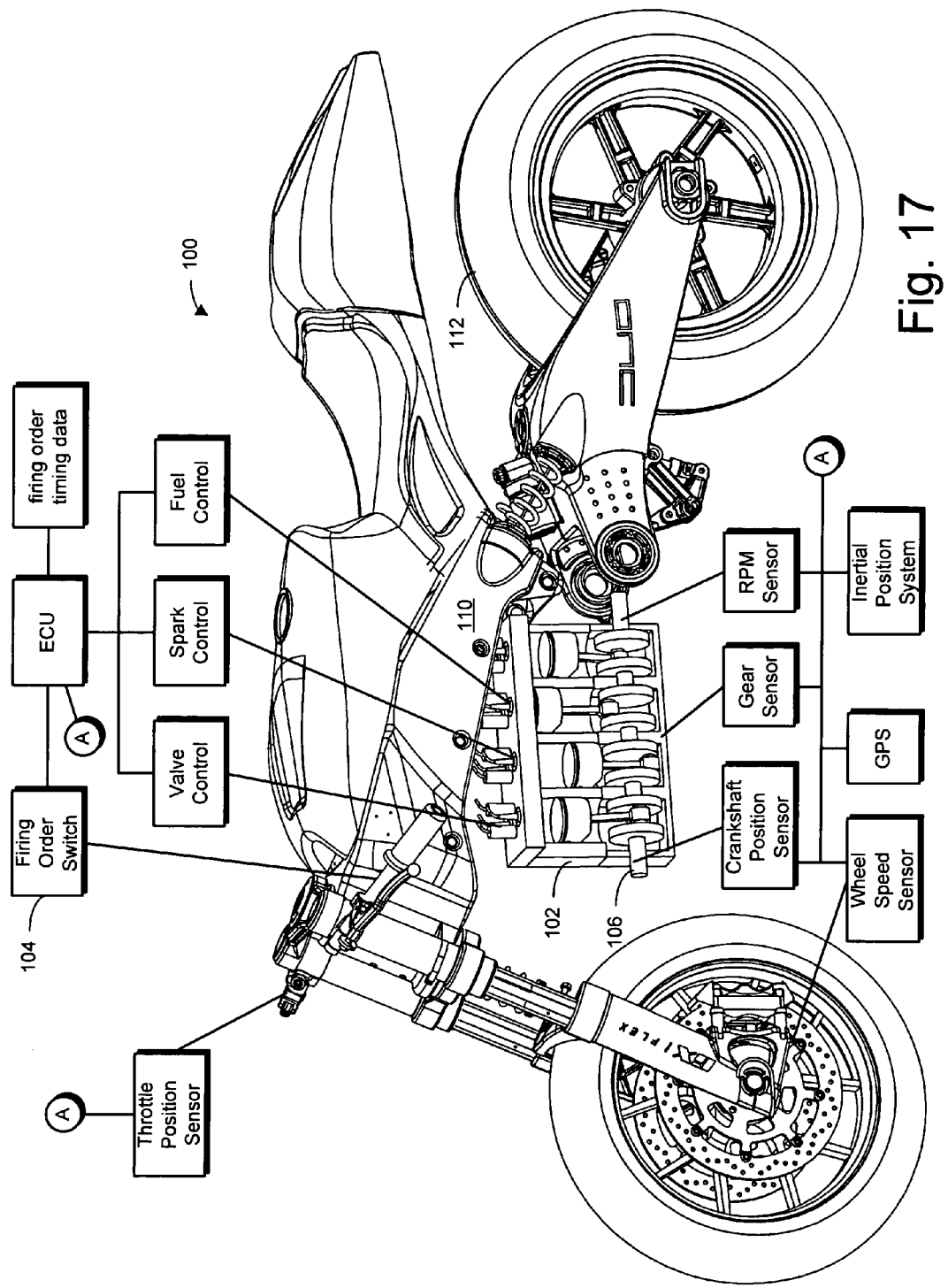
FIG. 17 shows a motorcycle equipped to perform one embodiment of a method according to this invention.

FIG. 17 illustrates one embodiment of an a motor vehicle 100 which includes an improved multi-cylinder four-stroke engine 102 that permits an on-the-fly change between two or more firing orders. The motor vehicle includes a frame 110 to which the engine is coupled, and a driven wheel 112 which is powered by the engine.

The motor vehicle is illustrated as being a motorcycle. Although a racing motorcycle is one application in which the present invention may be especially advantageous, the invention is not limited to use in motorcycles, but can be used in essentially any vehicle which has a four-stroke engine.

A firing order selector switch 104 is triggered, causing a new firing order to be selected for the multiple cylinders coupled to the engine's crankshaft 106. In some embodiments, the firing order selector is actuated by the vehicle operator; for example, the engine may be a motorcycle engine, and the rider may wish to use a "big bang" firing order in a tight, technical section of the race track in which it is critical to have maximum acceleration out of corners, and to use a "screamer" firing order on long straight sections of the race track where smooth power delivery and maximum horsepower are paramount.

In other embodiments, the firing order selector is actuated automatically, such as by the ECU. For example, the engine may be in a truck, and it may be desirable to use a "big bang" firing order in lower gears for improved torque, and a "screamer" firing order in higher gears for a more comfortable or fuel economic freeway drive.

The firing order selector may simply ping-pong between two firing orders, or it may circularly cycle through three or more firing orders, or it may enable direct selection of a desired firing order, or what have you.

The firing order selector may variously be coupled to the ECU, the spark plugs, the fuel injectors, and/or the valve actuators.

When changing between two firing orders (the current firing order and the new firing order), each cylinder will either be left alone or it will be shifted 360°. If it is shifted, the rotation phase that is its intake stroke in the current firing order will be its power stroke in the new firing order, and vice versa; and the rotation phase that is its compression stroke in the current firing order will be its exhaust stroke in the new firing order, and vice versa. Intake and power are interchanged, because the piston is moving from TDC to BDC during each of them. Intake and power are 360° apart. Similarly, compression and exhaust are interchanged, because the piston is moving from BDC to TDC during each of them, and they are 360° apart.

When switching between intake and power strokes, the differences are: the intake valve is open during the intake stroke but closed during the power stroke; the fuel injector (if any) is actuated during the intake stroke but not during the power stroke; and the spark plug is fired at the start of the power stroke but, in some engines, it is not fired at the start of the intake stroke. The exhaust valve is closed during both intake and power.

When switching between compression and exhaust strokes, the difference is: the exhaust valve is open during the exhaust stroke but closed during the compression stroke. During both, the intake valve is closed, the fuel injector is inactive, and the spark plug is not fired.

Again, this is a simplification, for ease of explanation. An optimized engine will, of course, not operate its valves, fuel injectors, and/or spark plugs strictly at 180° crank phase intervals, as is well known in the art.

The motor vehicle includes a crankshaft position sensor, a valve control mechanism, an optional spark control mechanism, and an optional fuel control mechanism, all coupled to the ECU. If the motor vehicle is equipped to automatically switch firing order, it includes one or more environmental sensors which trigger, or whose output is analyzed by the ECU to trigger, the firing order switch. For example, it may include a gear sensor which detects which gear the gearbox (not shown) is in, an RPM sensor which detects how fast the crankshaft is rotating, a wheel speed sensor which determines the road speed of the vehicle, a throttle position sensor which determines the position and/or velocity of the throttle, a global positioning position (GPS) receiver, and/or an inertial position sensor such as a computerized track map coupled with an accelerometer. The environmental sensors are coupled to the ECU or to a secondary control module (not shown) which analyzes their output.

Figure 18:
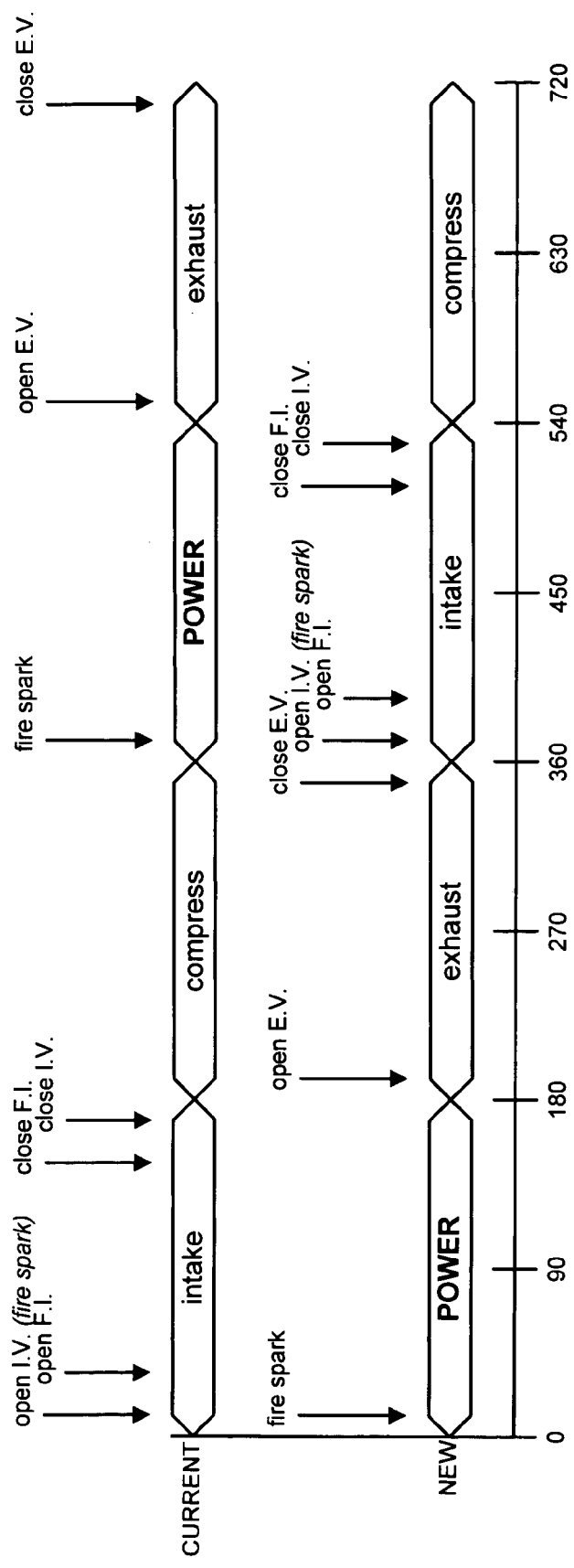
FIG. 18 shows a simplified 720° four-stroke cycle, showing the 360° phase relationships between the strokes of a current firing order and a new firing order, and identifying engine events which occur at the various crankshaft rotation marks.

FIG. 18 illustrates the 360° phase shift that happens when a cylinder's firing sequence is changed pursuant to a switch from an old firing order to a new firing order. The firing order selector can be triggered e.g. by the rider at any arbitrary point during the 720° four-stroke cycle.

Simple Switching Mode

In one embodiment, the current stroke is allowed to run normally to completion, and the change is made at the end of that stroke by simply switching to the next stroke of the new firing order.

If the rider triggers the switch at any time during the intake stroke, the intake stroke runs to completion (meaning the intake valve (I.V.) is opened, the spark plug is optionally fired, the fuel injector (F.I.) is opened and allowed to inject fuel for a time, then the fuel injector is closed, and the intake valve is closed. Then, at the 180° rotation mark, instead of continuing on with the compression stroke of the current firing order, that cylinder switches to the exhaust stroke of the new firing order. The exhaust valve (E.V.) is opened, the piston rises, expelling the unburned fuel/air mixture, and the exhaust valve is closed. Then, the intake stroke of the new firing order is performed. One cylinder's worth of unburned fuel/air mixture will have been expelled into the exhaust stream, where it will burn, causing a trivial exhaust detonation.

If the rider triggers the switch at any time during the compression stroke, then at the 360° rotation mark, instead of continuing on to the power stroke of the current firing order, that cylinder switches to the intake stroke of the new firing order. The intake valve is opened, the spark plug is optionally fired, and the fuel injector is opened. It should be noted that during normal operation (not switching firing orders), the intake stroke is preceded by the exhaust stroke, and, therefore, at the start of the intake stroke, the cylinder is not pressurized. In this simple switching mode, however, when the intake valve is opened here, the cylinder is pressurized, and the fuel/air mixture will be expelled into the intake tract. This may, in some applications, be undesirable. It should further be noted that if the spark plug is fired—some simplistic machines fire the spark plug every 360° of crank rotation, to avoid having to keep track of 720° of rotation—it will cause a backfire event, with the compressed fuel/air mixture burning as it is expelled back into the intake tract. In some applications, this may be highly undesirable.

If the rider triggers the switch at any time during the power stroke, at the 540° rotation mark, instead of continuing on to the exhaust stroke of the current firing order, that cylinder switches to the compression stroke of the new firing order. The exhaust gasses are recompressed, and the following power stroke attempts to re-burn them, typically with no real effect. Then, they are expelled at the following exhaust stroke, and normal operation resumes.

If the rider triggers the switch at any time during the exhaust stroke, the exhaust stroke operates to completion, with both valves being closed at its end. Then, at the 720°/0° rotation mark, rather than continuing on to the intake stroke of the current firing order, that cylinder switches to the power stroke of the new firing order. The spark plug is fired on a non-pressurized cylinder, and nearly nothing happens during the power stroke, other than that piston resisting (due to vacuum) being drawn downward. If the valves are held tightly closed, the piston will rob a tiny amount of power. Then, at the following exhaust stroke, the exhaust valve is opened with the piston near BDC, and, instead of exhaust being forced out, some exhaust will initially be sucked into the cylinder, but it will then be re-expelled as the piston continues to approach TDC. If the valves are not held tightly closed, one or both may be vacuumed partly open by the descending piston, drawing fuel/air mixture and/or exhaust gasses into the cylinder. In either case, normal operation will resume with the following intake stroke.

Delay to Intake Stroke Mode

In another embodiment, the switch to the new firing order is made at the end of the current firing order's intake stroke, regardless of when the rider triggers the switch, proceeding then to the exhaust stroke of the new firing order. This mode avoids the problems of backfire, expelling pressurized fuel/air mixture into the intake tract, and piston vacuum described above.

Delay to Power Stroke Mode

In yet another embodiment, the switch to the new firing order is made at the end of the current firing order's power stroke, regardless of when the rider triggers the switch, proceeding then to the compression stroke of the new firing order. This mode avoids the problems which the Delay to Intake Stroke Mode avoids, and also avoids the problem of expelling unburned fuel/air mixture into the exhaust manifold.

Other Modes

Other, hybrid or more complicated modes are certainly possible. It may not be necessary to treat an entire cycle the same. For example, if the rider triggers the switch early enough in the intake stroke, it may be possible to immediately shut off the fuel injector and/or close the intake valve, so the switch to the exhaust stroke of the new firing order does not expel (as much) unburned fuel/air mixture into the hot exhaust manifold.

In some embodiments, there may be a variety of conditions—in addition to and/or in lieu of a rider-initiated switch—which will cause a switch to a new firing order. For example, a racing motorcycle may always use a big bang order in first and second gears, but a screamer order in third through sixth gears. In this instance, the switch is made automatically by the ECU, in response to and during the time in which the gear shift is being made. Many racing motorcycles are equipped with an ignition cutoff which momentarily interrupts the spark during shifting, to help the gearbox operate more smoothly and more rapidly. That functionality is quite nicely dovetailed with the present invention.

As another example, it may be desirable to use one firing order in a first RPM range, and a different firing order outside that RPM range. For example, it may be desirable to have a big bang firing order below 7,000 RPM and a screamer firing order above 7,000 RPM.

As another example, it may be desirable to use a big bang firing order in a particular section of a race track, and a screamer firing order in another section of the race track. The rider may trigger the switch, or, in a motorcycle equipped with telemetry data acquisition equipment (from which the ECU can determine the motorcycle's track location) or global positioning system (GPS) or the like, the switch can be made automatically.

A rider or the ECU may trigger a switch to a new firing order based upon e.g. tire wear, detected excessive wheel spin, ambient temperature, rain, or any of a variety of other conditions.

The automatic switching conditions of the ECU may be reprogrammed to suit required conditions.

Direct control over the opening and closing of the valves is key to practicing this invention. In other words, it is necessary that the opening and closing of the valves not be solely and directly tied to four-stroke 720° crankshaft rotational position. Ideally and most simply, direct control valve actuators such as pneumatic or hydraulic actuators are used. However, if a sliding camshaft or other such mechanical means is employed, the invention can be practiced. What is required is the ability to switch the operation of one or more of the cylinders 360° forward or backward within the 720° four-stroke cycle.

Although the invention has been described with reference to engines having a single crankshaft, it is readily practiced with multi-crankshaft engines such as that described in U.S. Pat. No. 6,807,927 to Michael Czysz. And, although the invention has been described with reference to crankshafts designed for in-line multi-cylinder engines, it is certainly useable in other engine configurations, such as V-8, V-12, boxer, W, rotary, and so forth.

FIG. 19 illustrates one exemplary method 150 of performing a firing order switch in a flat crankshaft four-cylinder engine. The reader may also wish to reference FIGS. 9 and 10. When the ECU receives 152 a firing order switch trigger signal (e.g. from internal logic or from a rider-operated switch), the first thing is to determine what the current firing order is, and to which new firing order the engine should switch. In the example shown, there are only two firing orders: screamer and big bang.

If 154 the engine is currently in screamer mode, then the new firing order will be big bang. Cylinders 3 and 4 are to be switched, and Cylinders 1 and 2 will remain unswitched; that is, Cylinders 1 and 2 operate exactly the same in either firing order, while Cylinders 3 and 4 must each shift by 360°. If 156 the crankshaft is not currently between the 180° position and the 360° position, meaning it is before 180° or after 360°, then the ECU waits 158 until the crankshaft is at the 180° position—which corresponds to the end of Cylinder 4's power stroke—then it switches 160 Cylinder 4 (or, more precisely, it switches the fuel injector, spark plug, and valve controllers of Cylinder 4) to use big bang timing data. The ECU then waits 162 for the crankshaft to reach the 360° position—which corresponds to the end of Cylinder 3's power stroke—then it switches 164 Cylinder 3 to use big bang timing data.

If 156 the crankshaft was between the 180° and 360° positions, the same logic flow could be used. However, in the embodiment shown, a slight optimization has been made. The ECU waits 166 until the crankshaft reaches the 360° position, then it switches 168 Cylinder 3 to use big bang timing data. The ECU then waits 170 for the crankshaft to get back around to the 180° position, then it switches Cylinder 4 to use big bang timing data. This optimization not only finishes the switch 180° earlier than if the ECU simply waited to do Cylinder 4 first, but it also puts 360° additional rotation between the switching of the two cylinders, which may produce a less noticeable switch.

In either case, both cylinders have been switched, and the ECU sets 174 the engine to run in big bang mode. There may be additional context switching tasks or data which are not cylinder-specific. For example, the engine may have a different preferred operating temperature in big bang mode than in screamer mode. Or, the engine may have different fuel consumption in one mode than in the other.

If 154 the engine started out in big bang mode and is being switched to screamer mode, a similar logic flow is used. If 176 the crankshaft is currently not between 540° (the end of Cylinder 4's power stroke) and 720° (the end of Cylinder 3's power stroke), the ECU waits 178 for the crankshaft to get to the 540° position, then it switches 180 Cylinder 4 to use screamer mode timing data. The ECU then waits 182 for the crankshaft to get to the 720° position, then it switches 184 Cylinder 3 to use screamer mode timing data.

If 176 the crankshaft is between 540° and 720° when the firing order switch is triggered, the ECU waits 186 for the crankshaft to reach the 720° position, then it switches 188 Cylinder 3 to use screamer mode timing data. The ECU then waits 190 for the crankshaft to get back around to the 540° position, then it switches 192 Cylinder 4 to use screamer mode timing data.

In either case, both cylinders have been switched, and the ECU sets 194 the engine to run in screamer mode.

The skilled reader will readily appreciate that this is but one example of a method of performing a firing order switch, and that many other possibilities and options are useable within the principles of this invention.

For example, it may, in some applications, be desirable to switch only one of the cylinders, then wait a number of complete crankshaft revolutions before switching the other cylinder. As another example, it may be desirable to use a repeated back-and-forth switching between firing orders, to perform the same "rev limiter" function as is presently performed by simply interrupting the spark to one or two cylinders.

CONCLUSION

The absolute and relative sizes of the various suspension components are shown in the drawings for ease of illustration only. In practice, the skilled designer will select components of various geometries according to the needs of the application at hand.

The invention may be practiced in any form of four-stroke engine, such as a gasoline engine, a diesel engine, a Miller-cycle engine, a supercharged engine, a turbocharged engine, and so forth. The invention may be used in a carbureted engine, a fuel injected engine, and so forth. The invention may be used in an engine with conventional "stem-and-petal" valves, an engine with rotary valves, and so forth.

When one component is said to be "adjacent" another component, it should not be interpreted to mean that there is absolutely nothing between the two components, only that they are in the order indicated.

The various features illustrated in the figures may be combined in many ways, and should not be interpreted as though limited to the specific embodiments in which they were explained and shown.

Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

What is claimed is:
1. A motor vehicle comprising:
   a frame;
   a wheel coupled to the frame; and
   an engine coupled to the frame to drive the wheel, the engine including,
      (a) a crankshaft having a plurality of big pins,
      (b) a plurality of cylinders each including,
         (1) a piston disposed within the cylinder and coupled to a corresponding one of the big pins,
         (2) an exhaust valve, and
         (3) an intake valve, and
      (c) means for switching operation of the engine from a first firing order to a second firing order while the engine is running.

2. The motor vehicle of claim 1 wherein the engine further includes:
a crankshaft position sensor coupled to the crankshaft and to the means for switching.

3. The motor vehicle of claim 1 wherein:
the motor vehicle further comprises an engine control unit coupled to the engine; and
the engine further includes, for each of the plurality of cylinders,
an exhaust valve actuator coupled to operate the exhaust valve,
an intake valve actuator coupled to operate the intake valve; and
the engine control unit is responsive to the means for switching to shift operation of the exhaust valve actuator and the intake valve actuator of at least one of the cylinders by substantially 360° of rotation of the crankshaft.

4. The motor vehicle of claim 3 wherein:
the motor vehicle further comprises a fuel injector controller;
the engine further includes, for each of the plurality of cylinders,
a fuel injector; and
the engine control unit is further responsive to the means for switching to shift operation of the fuel injector of the at least one of the cylinders by substantially 360° of rotation of the crankshaft.

5. The motor vehicle of claim 4 wherein:
the motor vehicle further comprises a spark controller;
the engine further includes, for each of the plurality of cylinders,
a spark plug; and
the engine control unit is further responsive to the means for switching to shift operation of the spark plug of the at least one of the cylinders by substantially 360° of rotation of the crankshaft.

6. The motor vehicle of claim 1 wherein the means for switching comprises a manually operated switch operable by an operator of the motor vehicle.

7. The motor vehicle of claim 1 wherein the means for switching comprises an automatically operated switch which is activated in response to an environmental condition.

8. The motor vehicle of claim 7 wherein the automatically operated switch activates in response to at least one environmental condition detected by a sensor comprising at least one of:
a gear sensor;
an RPM sensor;
a wheel speed sensor;
a throttle position sensor;
a GPS receiver; and
an inertial position system.

9. The motor vehicle of claim 1 comprising a motorcycle.

10. The motor vehicle of claim 1 comprising an automobile.

11. The motor vehicle of claim 1 comprising a boat.

12. The motor vehicle of claim 1 comprising an airplane.

13. An internal combustion engine comprising:
a crankcase;
a crankshaft including,
a plurality of axial center pins rotatably coupled to the crankcase,
a plurality of big pins offset from the center pins, and
a plurality of webs coupling the big pins to the center pins;
a cylinder block coupled to the crankcase and including a plurality of cylinders;
a plurality of pistons each disposed within a respective one of the cylinders and coupled to a respective one of the big pins by a connecting rod;
a head coupled to the cylinder block and including, for each of the cylinders,
an intake valve,
an exhaust valve, and
means for providing fuel into the cylinder;
means for controlling timing of operation of at least one of (i) the valves, and (ii) the means for providing fuel, of at least one of the cylinders; and
means, coupled to the means for controlling timing, for causing a change from a first firing order to a second firing order.

14. The internal combustion engine of claim 13 wherein the means for causing a change comprises:
a manually-operated switch.

15. The internal combustion engine of claim 13 wherein the means for controlling timing comprises:
an electronic engine control unit.

16. The internal combustion engine of claim 15 wherein the means for controlling timing further comprises:
memory storage storing a plurality of timing order maps for at least one of the cylinders.

17. The internal combustion engine of claim 15 wherein the means for causing a change comprises at least one of:
a gear sensor;
an RPM sensor; and
a throttle position sensor.

18. The internal combustion engine of claim 13 wherein:
the head further includes, for each cylinder,
a spark plug;
the means for controlling timing is further for controlling operation of the spark plug of the at least one of the cylinders.

19. The internal combustion engine of claim 13 further comprising:
a crankshaft position sensor coupled to the crankshaft;
wherein the means for causing the change in the firing order is responsive to the crankshaft position sensor, whereby the change is effected at a predetermined crankshaft position.

20. A method of switching from a first firing order to a second firing order in a multi-cylinder internal combustion reciprocating piston engine which operates according to a four-stroke cycle, wherein the engine includes a crankshaft having a plurality of offset big pins to which respective pistons are coupled by respective connecting rods, and, for each cylinder, an intake valve, an exhaust valve, and one of a carburetor and a fuel injector, and wherein the method comprises:
receiving a firing order switch trigger;
for at least one of the cylinders, in response to the firing order switch trigger,
waiting until a predetermined position of the crankshaft, then
shifting timing of operation of the cylinder's valves by substantially 360° of rotation of the crankshaft, such that, substantially at the end of a current stroke, operation of the cylinder's valves skips two strokes of the four-stroke cycle.

21. The method of claim 20 wherein the operation of the cylinder's valves skips from the end of a power stroke to the beginning of a compression stroke.

22. The method of claim 20 wherein the operation of the cylinder's valves skips from the end of an intake stroke to the beginning of an exhaust stroke.

23. The method of claim 20 wherein the operation of the cylinder's valves skips from the end of a compression stroke to the beginning of an intake stroke.

24. The method of claim 20 wherein the operation of the cylinder's valves skips from the end of an exhaust stroke to the beginning of a power stroke.

25. The method of claim 20 wherein the crankshaft comprises a 180° flat four-cylinder crankshaft and the method further comprises:

switching cylinders 3 and 4 from the first firing order to the second firing order.

26. The method of claim 20 wherein the crankshaft comprises a 90° four-cylinder crankshaft and the method further comprises:

switching cylinders 3 and 4 from the first firing order to the second firing order.

27. The method of claim 20 wherein the crankshaft comprises a 720° five-cylinder crankshaft and the method further comprises:

switching cylinders 2 and 4 from the first firing order to the second firing order.

28. The method of claim 20 wherein the crankshaft comprises a 120° six-cylinder crankshaft and the method further comprises:

switching cylinders 2, 3, and 6 from the first firing order to the second firing order.

29. The method of claim 20 wherein:

the first firing order comprises one of a screamer firing order and a big bang firing order; and the second firing order comprises the other of the screamer firing order and the big bang firing order.

30. A method of operating an internal combustion engine according to a four-stroke cycle including an intake stroke, a compression stroke, a power stroke, and an exhaust stroke, the engine including (i) a crankshaft which has a plurality of big pins, (ii) a plurality of pistons coupled to the crankshaft, (iii) a plurality of cylinders within which respective pistons are reciprocatingly disposed, and (iv) intake and exhaust valves for each cylinder, wherein the method comprises:

(1) during a first time, for each 720° of rotation of the crankshaft including two 360° rotations, for each cylinder, synchronizing operation of its valves to a selected one of the 360° rotations such that each cylinder operates according to the four-stroke cycle and the multiple cylinders operate according to a first firing order;

(2) receiving a switch trigger; and (3) in response to the switch trigger, during a second time, for each 720° of rotation of the crankshaft, for each of at least one of the cylinders, synchronizing operation of its valves to the other of the 360° rotations such that multiple cylinders operate according to a second firing order.

31. The method of claim 30 further comprising:

(1) during the first time, for each 720° of rotation of the crankshaft, for each cylinder, synchronizing operation of its fuel injector to the selected one of the 360° rotations; and (3) during the second time, for each 720° of rotation of the crankshaft, for each of the at least one of the cylinders, synchronizing operation of its fuel injector to the other of the 360° rotations.

32. The method of claim 31 further comprising:

(1) during the first time, for each 720° of rotation of the crankshaft, for each cylinder, synchronizing operation of its spark plug to the selected one of the 360° rotations; and (3) during the second time, for each 720° of rotation of the crankshaft, for each of the at least one of the cylinders, synchronizing operation of its spark plug to the other of the 360° rotations.

* * * * *